Sept. 10, 1963 L. T. ZITELLI 3,103,609
KLYSTRON AMPLIFIER WTIH TEMPERATURE COMPENSATED TUNING MEANS
Original Filed July 22, 1954 3 Sheets-Sheet 1
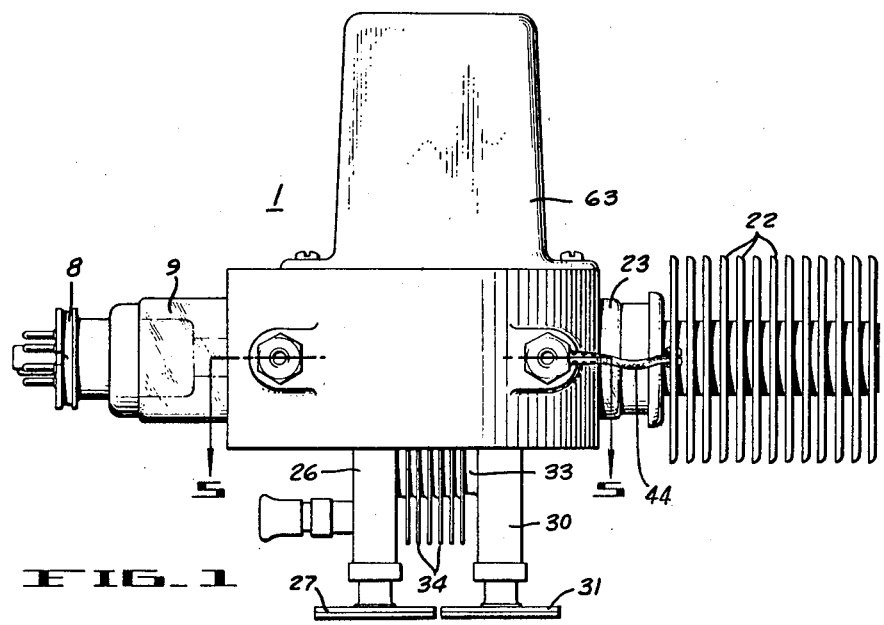
FIG_1
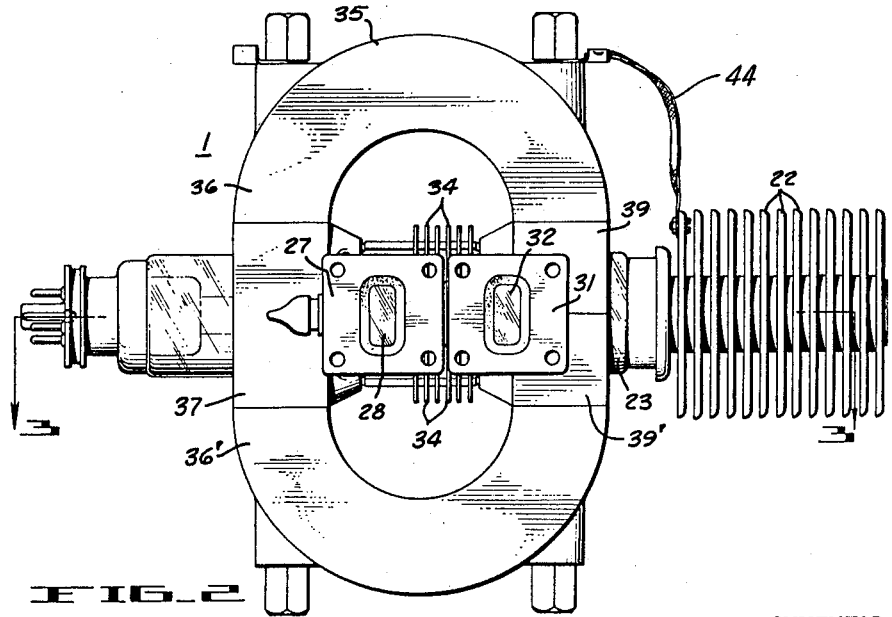
FIG_2
INVENTOR.
Louis T. Zitelli
Attorney

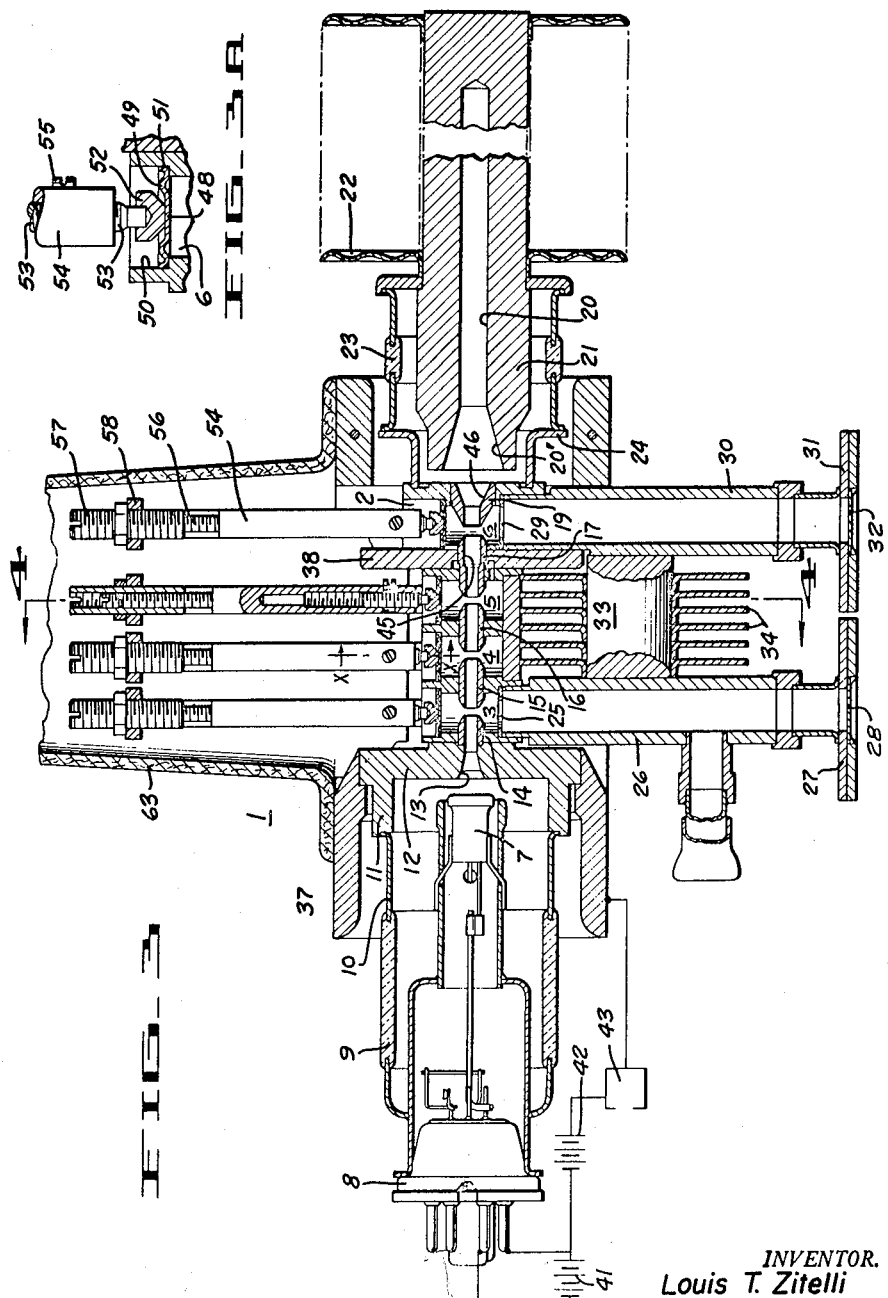

Sept. 10, 1963     L. T. ZITELLI     3,103,609
KLYSTRON AMPLIFIER WTIH TEMPERATURE COMPENSATED TUNING MEANS
Original Filed July 22, 1954     3 Sheets-Sheet 3
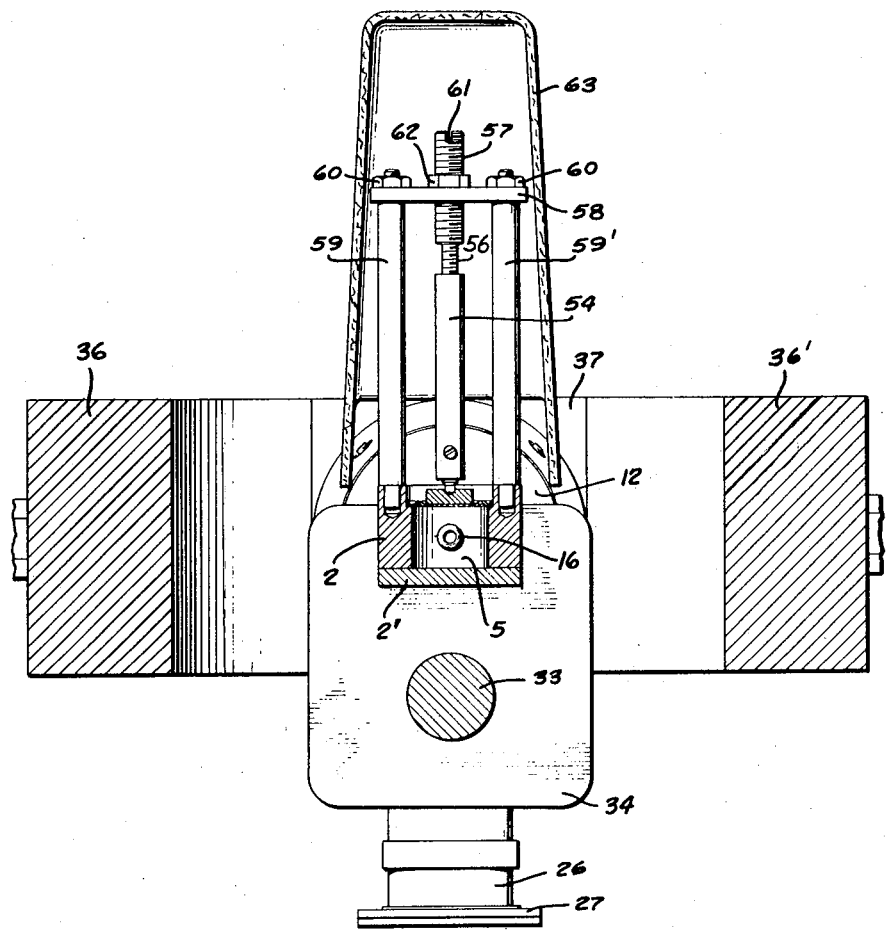
FIG_4
INVENTOR.
Louis T. Zitelli
BY
Attorney United States Patent Office 3,103,609
Patented Sept. 10, 1963

3,103,609
KLYSTRON AMPLIFIER WITH TEMPERATURE COMPENSATED TUNING MEANS
Louis T. Zitelli, Palo Alto, Calif., assignor to Varian Associates, San Carlos, Calif., a corporation of California
Original application July 22, 1954, Ser. No. 445,095, now Patent No. 2,915,670, dated Dec. 1, 1959. Divided and this application Sept. 28, 1959, Ser. No. 842,782
14 Claims. (Cl. 315—5.48)

This invention relates generally to klystron amplifiers and the invention has reference more particularly to a novel high power and high gain pulsed klystron amplifier adapted for a variable duty cycle and which is especially suitable for fixed frequency transmitter use.

The present invention is a divisional application of U.S. Patent 2,915,670, Serial No. 445,095, entitled "Klystron Amplifier," filed July 22, 1954, inventor Louis T. Zitelli and issued on December 1, 1959.

In many applications it is oftentimes desired as in radar use to employ a high gain pulsed amplifier of high power and fixed frequency. Heretofore, such transmitters have been generally unavailable as it has been difficult or impossible to combine all of these desired qualities in a single tube. For example, a high powered tube would often drift as to frequency or if the frequency was strictly controlled the output power and gain of the tube would be greatly limited.

It is therefore the principal object of the present invention to provide a novel pulsed klystron amplifier tube of high frequency stability and high power and gain characteristics and which is adapted for a variable duty cycle.

A feature of the invention is to provide a novel tube that has a tuning mechanism provided with temperature compensating means for enabling the tube to have performance stability over a wide ambient and tube range of temperature.

Another feature of the invention is to provide novel method and means for effecting the rapid dissipation of heat generated within the tube in use.

Other features and advantages of this invention will become apparent from the specification taken in connection with the accompanying drawings wherein the invention is embodied in concrete form.

In the drawings,

FIG. 1 is a plan view of the novel amplifier of the present invention,

FIG. 2 is a view of the elevation of the structure of FIG. 1,

FIG. 3 is an enlarged fragmentary sectional view taken along the line 3—3 of FIG. 2 looking in the direction of the arrows, FIG. 3a is an enlarged sectional view taken along the line X—X of FIG. 3, and FIG. 4 is a part sectional view taken along the line 4—4 of FIG. 3.

Similar characters of reference are used in the above figures to designate corresponding parts.

Referring now to the drawings, reference numeral 1 designates the novel multicavity klystron tube of this invention. This tube comprises body portion 2 (FIG. 4) which is shown as made out of a solid block having cavity resonators 3, 4, 5 and 6 machined out of the same and having a closure plate 2' (FIG. 4).

An emitter 7 (FIG. 3) of the focusing type is carried by a contact base member 8 that is supported in turn through insulating sleeve 9 and metallic sleeve 10 to an annular flange 11 provided on the accelerating electrode or anode 12 which anode is provided with a central tapered bore 13 that is aligned with the emitter 7. The emitter is supplied with heating current from source 41 whereas the anode is supplied with accelerating voltage from source 42 acting through pulse modulator 43.

The focused beam leaving the emitter 7 in use will flow through the tapered bore 13 conforming more or less to this bore and pass centrally through each of the resonators 3, 4, 5 and 6 in succession, these resonators being provided with drift tubes 14, 15, 16, 17 and 19 having central apertures aligned with the bore 13 for receiving the electron beam and providing operating gaps within each of the resonators. The ends of the drift tubes 14, 15, 16, 17 and 19 within the resonators have their opposed ends beveled at 18 so that any secondaries emitted from these beveled ends within the resonators move normally with respect to the beveled end surfaces and fly off into the interior of the resonator without doing any harm. The A.C. fields present in resonators 3, 4 and 5 are insufficiently intense to cause electrons to bombard the opposed beveled ends of the adjacent drift tubes which bombardment would cause multipactor action and reduce the output power of the tube accordingly.

The beam after leaving the final cavity 6 passes through the re-entrant exit drift tube 19 and into the hollow interior bore 20 of a collector 21 shown as a solid block of copper. The bore 20 is shown having a flared entrance portion 20' for collecting any spreading electrons leaving the final or output resonator 6. The bore 20 is shown of considerable depth so that the beam can be collected over a relatively large area and this fact, together with the massive nature of the collector, tends to conduct the heat radially away from the inner portion of the collector and to a series of radial fins 22 provided on the exterior surface of the collector 21, which fins serve to radiate the heat generated into space. The collector 21 is shown supported through an insulating sleeve 23 upon a hollow tubular support 24 that is carried by the body 2. A lead 44 serves to maintain collector 21 at the voltage of the cavity block 2 in use.

The input cavity 3 (FIG. 3) is provided with a window or iris 25 that communicates with an input waveguide 26 which is shown of heavy copper construction making good thermal contact with the body 2. The outer end of the waveguide 26 is provided with an output flange 27 having a mica window 28, the said flange 27 being adapted to be bolted directly to a communicating waveguide. Similarly the last or output resonator 6 is provided with an output window or iris 29 communicating with a waveguide 30 that is also of heavy copper construction and is firmly attached to the body 2 in good thermal conductive relation. Similarly the outer end of waveguide 30 is provided with a coupling flange 31 having a mica window 32. The entire interior of the tube including emitter 7, the resonators 3, 4, 5 and 6, the collector cavity 20, and the waveguides 26 and 30 is evacuated in use.

Interposed between the input and output waveguides 26 and 30 there is provided a heavy copper block 33 in good thermal contact with these waveguides so that heat flowing from the body 2 in use through the heavy conducting walls of waveguides 26 and 30 will pass readily into the block 33 which block is provided on its exterior surface with a plurality of heat radiating fins 34, which fins also extend to cover a portion of the body 2 to aid in radiating heat directly from this body.

The resonators are each adapted to be independently tuned by a novel compensating tuning structure consisting of an inductive side wall tuner comprising a flexible substantially oval-shaped disk 48, see especially FIGS. 3 and 3a. The disk 48 is shown provided with a substantially oval-shaped corrugation or ridge 49 to enhance the flexibility thereof, the said disk having a peripheral flange 51 adapted to be set and sealed within a stepped opening 50 provided in the side wall of the cavity such as cavity 6, for example. The disk 48 is retained within the stepped aperture 50 as by brazing and has a pedestal or shoe member 52 secured to its central portion as by brazing. A screw 53 as of stainless steel projects into and is brazed within a recess provided in the shoe 52 and extends outwardly from this shoe and is threaded into an aluminum actuating rod 54. A set screw 55 may be used to secure the screw 53 in adjusted position within the rod 54. The exterior of the outwardly projecting end portion of rod 54 is threaded at 56 and extends into a threaded interior bore of a screw sleeve 57 as of stainless steel which sleeve in turn is threaded through the central portion of a header or cross bar 58 (FIG. 4) that has its outer end portions fixedly carried by the outer ends of spaced molybdenum support members or rods 59 and 59'. The rods 59 and 59' have their inner ends secured within suitable recesses provided in the body 2 (see especially FIG. 4) and are shown as having reduced threaded outer ends provided with nuts 60 for retaining the cross bar 58 in place upon the rods 59 and 59'.

The outer end of screw sleeve 57 is provided with a screw driver slot 61 for screwing this sleeve inwardly and outwardly of header 58 and at the same time inwardly and outwardly with respect to the aluminum rod 54, the exterior threads of sleeve 57 and of the rod 54 at 56 being of slightly different pitch whereby a differential screw action takes place resulting in minute longitudinal movements of rod 54 as the screw sleeve 57 is turned thereby providing a very sensitive tuning of the resonator through movement of the flexible disk 48. Thus when it is desired to tune the resonators to match each other or to vary the tube frequency, the several screw sleeves 57 are adjusted to obtain the desired tuning whereupon lock nuts 62 may be tightened holding the desired tuning. Owing to the use of the molybdenum rods 59 and 59' and the cross bars 58 in conjunction with the aluminum rod 54 a rugged and dependable automatic temperature compensation device is provided which compensates automatically for changes in dimensions of the tube due to temperature variations of the tube and of the ambient atmosphere.

Thus as the tube heats up in use which heating would tend to enlarge the cavities 3, 4, 5 and 6, and hence lower the output frequency of the tube, the differential in thermal expansion between the aluminum rod 54 and the molybdenum rods 59 and 59' results in inward movement of the diaphragm or disk 48 tending to reduce the size of the respective resonator and hence automatically compensating for increased temperature. In order to more closely associate the temperature compensating device with the temperature of the tube body in use, a removable cover 63 as of plastic or plastic glass fiber combination is provided removably attached to the tube body and encloses the tuning mechanism. Thus, with the cover 63 in place the temperature of the tube body and the compensating device is substantially the same so that automatic tuning compensation is provided for changes in temperature whereby the output of the tube is maintained at substantially fixed frequency. The molybdenum rods 59 and 59' having a very low thermal coefficient of expansion whereas the aluminum rod 54 having a high coefficient of expansion results in the desired compensating action.

Since the cavities 3, 4, 5 and 6 are machined out of solid block material such as copper the body portion 2 has good heat conducting characteristics and quickly conveys away excess heat.

The novel tube of this invention in use is extremely valuable in connection with fixed frequency transmitter applications. A typical tube operating at X-band frequency is shown to provide a gain of 55 db and delivers in excess of 5 kw. of pulsed power into a matched load.

Since many changes could be made in the above construction of the novel klystron amplifier of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A multicavity klystron amplifier comprising a body portion having a plurality of cavity resonators therein, said body portion being of block construction for conducting heat readily from the resonators therewithin, waveguides affixed to said body portion and communicating with the first and last resonators thereof, said waveguides projecting outwardly in the same direction in spaced relaiton and having means at their outer ends for coupling to standard waveguides, a block of heat conducting material interconnecting said waveguides intermediate their lengths for conducting heat therefrom in use and a plurality of heat radiating fins affixed to said block and to said body portion for radiating heat into the atmosphere.

2. A klystron amplifier as defined in claim 1 having a temperature compensating inductive side wall tuning means provided therein, and cover means for enclosing said tuning means to maintain the same at substantially the same temperature as said amplifier body portion.

3. A klystron-amplifier comprising a cavity resonator having a flexible wall portion, and tuning means for said resonator comprising an actuating rod of relatively high thermal coefficient of expansion connected to said flexible well portion at one end, a pair of spaced rods of material having a relatively low thermal coefficient of expansion coupled at their inner ends to said resonator on opposite sides of said actuating rod, a cross bar coupled to the outer end portions of said spaced rods and coupled intermediate its length to said actuating rod, whereby differential thermal expansion of said spaced rods and said actuating rod tunes said cavity resonator, a differential screw mechanism included between said cross bar and said actuating rod to enable individual tuning of said cavity resonator, and a cover enclosing said tuning means for maintaining the same at a temperature commensurate with that of said cavity resonator.

4. A multicavity kylstron amplifier comprising: a body portion having a plurality of evacuated cavity resonators therein, said body portion being of block construction for conducting heat readily from the resonators therewithin, at least one of said resonators having a flexible wall portion for tuning thereof; and means for actuating said flexible wall portion comprising an actuating rod of relatively high thermal coefficient of expansion connected at one end to said flexible wall portion, a pair of spaced rods of material having a relatively low coefficient of thermal expansion attached at their inner ends to said body portion on opposite sides of said actuating rod, a cross bar attached to the outer end portions of said spaced rods and connected intermediate its length to said actuating rod whereby differential thermal expansion of said spaced rods and said actuating rod tunes said cavity resonator by movement of said flexible wall portion.

5. The apparatus according to claim 4 including a differential screw mechanism between said cross bar and said actuating rod to enable individual tuning of said cavity resonators.

6. The apparatus according to claim 4 wherein said flexible wall portion includes a relatively flat flexible diaphragm vacuum sealed at its periphery to said cavity resonator and having an oval corrugation therein to enhance flexure thereof in use.

7. A multicavity klystron amplifier comprising a body portion having a plurality of evacuated cavity resonators therein, at least one of said resonators having a flexible wall portion for tuning thereof; and means for actuating said flexible wall portion comprising an actuating rod of relatively high thermal coefficient of expansion connected at one end to said flexible wall portion, an actuating rod support member of material having a relatively low coefficient of thermal expansion attached at its inner end to said body portion and extending outwardly therefrom, means interconnecting said actuating rod and said support member at a point spaced apart outwardly of said body portion whereby differential thermal expansion of said support member and said actuating rod tunes said cavity resonator by movement of said flexible wall portion.

8. The apparatus according to claim 7 wherein said interconnecting means includes a differential screw mechanism between said support member and said actuating rod to enable individual tuning of said cavity resonators.

9. The apparatus according to claim 7 including a cover enclosing said actuating rod support member and said actuating rod for maintaining the same at a temperature commensurate with that of said cavity resonator.

10. The apparatus according to claim 7 wherein said flexible wall portion of said cavity resonator comprises an inductive tuning diaphragm.

11. The apparatus according to claim 10 including a shoe member made of good thermally-conducting material fixedly secured to the central portion of said flexible wall portion and interconnecting said wall portion and said actuating rod for readily conducting heat energy from said relatively thin-walled diaphragm to said actuating rod member.

12. Multicavity klystron amplifier including, a body portion having a plurality of evacuated cavity resonators therein, at least one of said resonators having a flexible wall portion for tuning thereof, means for actuating said flexible wall portion comprising an actuating rod connected at one end to said flexible wall portion, an actuating rod support member attached at its inner end to said body portion and extending outwardly therefrom, means interconnecting said actuating rod and said support member at a point spaced apart outwardly of said body portion, said actuating rod made of a material having a higher thermal coefficient of expansion than the material forming said actuating rod support member whereby differential thermal expansion of said support member and said actuating rod tunes said cavity resonator by movement of said flexible wall portion to compensate for changes in the resonant frequency of said evacuated cavities due to temperature changes of said body portion.

13. The apparatus according to claim 12 including a cover enclosing said actuating rod and said actuating rod support member for maintaining same at a temperature commensurate with that of said evacuated cavity resonators.

14. The apparatus according to claim 12 wherein said flexible wall portion of said cavity resonator comprises a relatively thin wall inductive tuning diaphragm, a shoe member made of good thermal conducting material fixedly secured to the central portion of said flexible wall portion and interconnecting said wall portion and said actuating rod for readily conducting heat energy from said relatively thin wall diaphragm to said actuating member.

References Cited in the file of this patent
UNITED STATES PATENTS

| | | |
|---|---|---|
| 2,408,817 | Snow | Oct. 8, 1946 |
| 2,606,302 | Learned | Aug. 5, 1952 |
| 2,798,982 | Neher | July 9, 1957 |
| 2,852,715 | Rich | Sept. 16, 1958 |
| 2,892,121 | Salisbury | June 23, 1959 |
| 2,915,670 | Zitelli | Dec. 1, 1959 |